United States Patent
Yang et al.

(10) Patent No.: US 8,042,376 B2
(45) Date of Patent: Oct. 25, 2011

(54) FUEL DISPENSER UTILIZING PRESSURE SENSOR FOR THEFT DETECTION

(75) Inventors: Zhou Yang, Oak Ridge, NC (US); John Steven McSpadden, Kernersville, NC (US); Benjamin T. Siler, Stokesdale, NC (US)

(73) Assignee: Gilbarco Inc., Greensboro, NC (US)

( * ) Notice: Subject to any disclaimer, the term of this patent is extended or adjusted under 35 U.S.C. 154(b) by 498 days.

(21) Appl. No.: 12/131,219

(22) Filed: Jun. 2, 2008

(65) Prior Publication Data
US 2009/0293989 A1    Dec. 3, 2009

(51) Int. Cl.
GO1F 25/00    (2006.01)
(52) U.S. Cl. .......................................... 73/1.16
(58) Field of Classification Search .................. 73/1.16, 73/861
See application file for complete search history.

(56) References Cited

U.S. PATENT DOCUMENTS

| | | |
|---|---|---|
| 3,939,649 A | 2/1976 | McCabe |
| 3,940,020 A | 2/1976 | McCrory et al. |
| 4,885,943 A | 12/1989 | Tootell et al. |
| 4,971,005 A | 11/1990 | Dyer et al. |
| 4,978,029 A | 12/1990 | Furrow et al. |
| 5,038,971 A | 8/1991 | Gayer et al. |
| 5,157,958 A | 10/1992 | Geisinger |
| 5,390,532 A | 2/1995 | Anthony |
| 5,447,062 A | 9/1995 | Kopl et al. |
| 5,673,736 A | 10/1997 | Farkas |
| 5,689,071 A | 11/1997 | Ruffner et al. |
| 5,717,564 A | 2/1998 | Lindale |
| 5,734,851 A | 3/1998 | Leatherman et al. |
| 5,954,080 A | 9/1999 | Leatherman |
| 5,956,259 A | 9/1999 | Hartsell, Jr. et al. |

(Continued)

FOREIGN PATENT DOCUMENTS

JP    2004-257525    9/2004

(Continued)

OTHER PUBLICATIONS

PCT International Search Report and Written Opinion of the International Searching Authority, Or The Declaration, dated Jul. 2, 2009.

(Continued)

*Primary Examiner* — Hezron E Williams
*Assistant Examiner* — Tamiko Bellamy
(74) *Attorney, Agent, or Firm* — Nelson Mullins Riley & Scarborough, LLP

(57) ABSTRACT

A method of determining whether a measured fuel delivery rate determined by a fuel meter of a fuel dispenser corresponds to an actual fuel delivery rate at which fuel is being dispensed to a vehicle through a fuel flow path. The method includes measuring a fuel delivery rate at a given time during a fueling operation, measuring a fuel pressure of the fuel within the fuel flow path at the given time, comparing the measured fuel pressure to a plurality of fuel pressure values from a data set including a plurality of actual fuel delivery rate values that correspond to the plurality of fuel pressure values, retrieving one of the plurality of actual fuel delivery rate values from the data set that corresponds to the measured fuel pressure value; and comparing the measured fuel delivery rate from the fuel meter to the one actual fuel delivery rate value to determine if the measured fuel delivery rate corresponds to the actual fuel delivery rate at which fuel is being dispensed to the vehicle.

17 Claims, 13 Drawing Sheets

U.S. PATENT DOCUMENTS

| | | | |
|---|---|---|---|
| 5,992,479 A | 11/1999 | Simpson | |
| 6,052,629 A | 4/2000 | Leatherman et al. | |
| 6,067,476 A | 5/2000 | Siler | |
| 6,098,467 A | 8/2000 | Wallen | |
| 6,148,801 A | 11/2000 | Wenzlawski | |
| 6,157,871 A | 12/2000 | Terranova | |
| 6,213,172 B1 | 4/2001 | Dickson | |
| 6,227,227 B1 | 5/2001 | Poleshuk et al. | |
| 6,302,165 B1 | 10/2001 | Nanaji et al. | |
| 6,347,649 B1 | 2/2002 | Pope et al. | |
| 6,363,299 B1 | 3/2002 | Hartsell | |
| 6,374,870 B1 | 4/2002 | Muller | |
| 6,375,434 B1 | 4/2002 | Taivalkoski et al. | |
| 6,381,514 B1 | 4/2002 | Hartsell | |
| 6,418,981 B1 | 7/2002 | Nitecki et al. | |
| 6,421,616 B1 | 7/2002 | Dickson | |
| 6,435,204 B2 | 8/2002 | White et al. | |
| 6,438,452 B1 | 8/2002 | Dickson | |
| 6,446,049 B1 | 9/2002 | Janning et al. | |
| 6,463,389 B1 | 10/2002 | Dickson | |
| 6,522,947 B1 | 2/2003 | Hartsell | |
| 6,532,999 B2 | 3/2003 | Pope et al. | |
| 6,542,832 B1 | 4/2003 | LaMothe | |
| 6,575,206 B2 | 6/2003 | Struthers et al. | |
| 6,629,455 B2 * | 10/2003 | Schrittenlacher et al. | 73/204.22 |
| 6,712,084 B2 | 3/2004 | Shajii et al. | |
| 6,721,669 B2 | 4/2004 | Kopl et al. | |
| 6,745,104 B1 | 6/2004 | Dickson | |
| 6,854,342 B2 | 2/2005 | Payne et al. | |
| 6,932,098 B2 | 8/2005 | Shajii et al. | |
| 6,935,191 B2 | 8/2005 | Olivier et al. | |
| 7,010,961 B2 | 3/2006 | Hutchinson et al. | |
| 7,028,561 B2 | 4/2006 | Robertson et al. | |
| 7,048,964 B2 | 5/2006 | McGlinchy et al. | |
| 7,073,392 B2 | 7/2006 | Lull et al. | |
| 7,076,330 B1 | 7/2006 | Dickson | |
| 7,111,520 B2 | 9/2006 | Payne et al. | |
| 7,152,004 B2 | 12/2006 | Reichler et al. | |
| 7,273,063 B2 | 9/2007 | Lull et al. | |
| 7,429,299 B2 | 9/2008 | McGlinchy et al. | |
| 7,497,083 B2 | 3/2009 | Yates et al. | |
| 7,681,460 B2 * | 3/2010 | Nanaji et al. | 73/861 |
| 7,689,371 B2 * | 3/2010 | Memmott et al. | 702/55 |
| 7,725,271 B2 | 5/2010 | Yang et al. | |
| 2001/0004909 A1 * | 6/2001 | Pope et al. | 141/59 |
| 2003/0114946 A1 | 6/2003 | Kitchen | |
| 2005/0056340 A1 * | 3/2005 | Walker et al. | 141/206 |
| 2005/0080589 A1 * | 4/2005 | Tiberi | 702/140 |
| 2007/0128050 A1 | 6/2007 | Cedrone et al. | |
| 2008/0033901 A1 * | 2/2008 | Wargo et al. | 706/52 |

FOREIGN PATENT DOCUMENTS

JP  2004-257526  9/2004

OTHER PUBLICATIONS

International Search Report and Written Opinion of the International Searching Authority dated Aug. 14, 2008 for PCT Application Serial No. PCT/US2008/004696, filed Apr. 10, 2008, corresponding to co-pending U.S. Appl. No. 11/737,986.

International Search Report and Written Opinion of the International Searching Authority dated Jan. 6, 2009 for PCT Application Serial No. PCT/US2008/083103, filed Nov. 8, 2008, corresponding to co-pending U.S. Appl. No. 11/939,345.

Non-Final Office Action for co-pending U.S. Appl. No. 11/737,986, dated Sep. 17, 2008.

Amendment to Non-Final Office Action for co-pending U.S. Appl. No. 11/737,986, dated Jan. 21, 2009.

Final Office Action for co-pending U.S. Appl. No. 11/737,986, dated May 5, 2009.

RCE and Amendment to Final Office Action for co-pending U.S. Appl. No. 11/737,986, dated Nov. 4, 2009.

Non-Final Office Action for co-pending U.S. Appl. No. 11/939,345, dated Jul. 23, 2009.

Amendment to Non-Final Office Action for co-pending U.S. Appl. No. 11/939,345, dated Oct. 23, 2009.

Non-Final Office Action for co-pending U.S. Appl. No. 12/728,468, dated Aug. 11, 2010.

\* cited by examiner

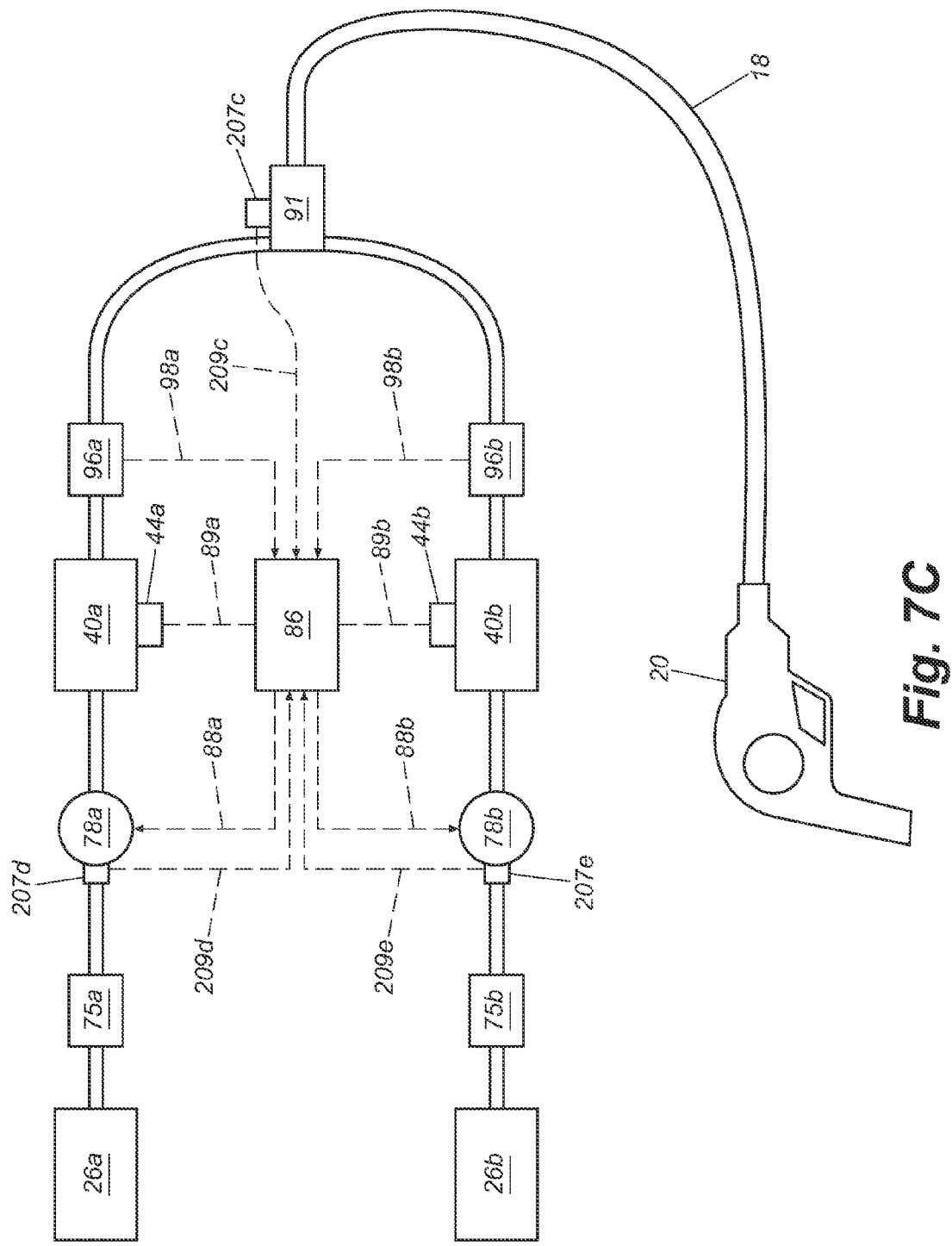

FUEL DISPENSER UTILIZING PRESSURE SENSOR FOR THEFT DETECTION

BACKGROUND OF THE INVENTION

The present invention generally relates to measuring volume of fuel dispensed through a fuel dispenser. More particularly, the present invention relates to a fuel dispenser using a pressure sensor to measure a flow parameter and thereby determine if the amount of fuel being delivered to a vehicle corresponds to the amount being measured by the fuel dispenser.

In a typical fuel dispensing transaction, a customer arranges for payment, either by paying at the fuel dispenser with a credit card or debit card, or by paying a cashier. Next, a fuel nozzle is inserted into the fill neck of the vehicle, or other selected container, and fuel is dispensed. Displays on the fuel dispenser indicate how much fuel has been dispensed as well as a dollar value of the purchase. Dependent upon the timing and manner of payment for the fuel, either the customer terminates the flow of fuel into the vehicle by manually releasing the fuel nozzle, or the fuel dispenser automatically terminates the flow of fuel either at a pre-selected dollar amount or when the tank of the vehicle is full.

FIG. 1 is a schematic showing components of a typical prior art fuel dispenser 100. As shown, fuel is pumped from an underground storage tank 102 through a fuel pipe 104 to a flexible fuel hose 105 which terminates with a fuel nozzle 106 including a fuel valve 108. To initiate fuel flow, the customer manually activates a trigger on fuel nozzle 106 which opens fuel valve 108 so that fuel is dispensed into the vehicle. Fuel flow through fuel valve 108 is detected by a flow switch 116 which, as shown, is a one-way check valve that prevents rearward flow through fuel dispenser 100. Once fuel flow is detected, flow switch 116 sends a signal on communication line 124 to a control system 120. Control system 120 is typically a microprocessor, a microcontroller, or other electronics with associated memory and software programs. Upon receiving the flow initiation signal from flow switch 116, control system 120 starts counting pulses generated by a pulser 118. The pulses are generated by the rotation of a fuel meter 114 and are directly proportional to the fuel rate being measured.

As is known, fuel dispensers keep track of the amount of fuel dispensed so that it may be displayed to the customer along with a running total of how much the customer will have to pay to purchase the dispensed fuel. This is typically achieved with fuel meter 114 and pulser 118. When fuel passes through fuel meter 114, it rotates and pulser 118 generates a pulse signal, with a known number of pulses being generated per quantity of fuel dispensed. The number of pulse signals generated and sent to control system 120 on communication line 126 are processed to arrive at an amount of fuel dispensed and an associated cost to the customer. These numbers are displayed to the customer to aid in making fuel dispensing decisions. As well, control system 120 uses the information provided by fuel meter 114 to regulate the operation of valve 112 during fueling operations.

As shown, fuel dispenser 100 includes a turbine fuel meter 114, such as that disclosed in U.S. Pat. No. 7,028,561, which is hereby incorporated by reference in its entirety. With some turbine fuel meters 114, the possibility exists that the rotors (not shown) of fuel meter 114 can bind during use, yet still allow fuel to pass through the meter. As such, pulser 118 either does not create pulses or creates a reduced number of pulses than it should, meaning the flow of fuel can either go undetected or is detected at a reduced flow rate, respectively. Other designs of non-positive displacement type fuel meters can be prone to this same issue.

In addition to inaccuracies based on mechanical failures, it is not uncommon for thieves to attempt to steal fuel by disabling various components of typical fuel dispensers. For example, a thief may initiate fuel flow into a vehicle through fuel nozzle 106. After fuel flow is initiated, the thief disables pulser 118 such that either no pulses, or a reduced number of pulses for a given fuel flow rate, are reported to control system 120 along communication line 126. In this manner, the amount of fuel delivered to the vehicle either goes undetected or under-reported to control system 120, respectively.

SUMMARY OF THE INVENTION

The present invention recognizes and addresses considerations of prior art constructions and methods. In one embodiment of the present invention, a fuel dispenser is configured to determine an actual fuel delivery rate at which fuel is being delivered to a vehicle during a fueling process. The fuel dispenser includes a fuel delivery path configured to deliver fuel to the vehicle, a fuel meter configured to measure a fuel delivery rate at which fuel is being dispensed through the fuel delivery path to the vehicle, a pressure sensor configured to measure a fuel pressure of fuel in the fuel delivery path, a microprocessor configured to determine the actual fuel delivery rate at which fuel is being delivered to the vehicle based on the measured fuel pressure from the pressure sensor, and a data set having a plurality of fuel pressure values corresponding to a plurality of actual fuel delivery rate values. The fuel meter determines the measured fuel delivery rate at a given time, the pressure sensor determines the measured fuel pressure at the given time, the microprocessor compares the measured fuel pressure to the plurality of fuel pressure values in the data set and determines which actual fuel delivery rate value from the data set corresponds to the measured fuel pressure and compares the measured fuel delivery rate from the fuel meter to the actual fuel delivery rate value from the data set to determine if the fuel meter is accurately measuring the actual fuel delivery rate at which fuel is being delivered to the vehicle.

Another embodiment includes a method of determining whether a measured fuel delivery rate determined by a fuel meter of a fuel dispenser corresponds to an actual fuel delivery rate at which fuel is being dispensed to a vehicle through a fuel flow path. The method includes measuring a fuel delivery rate at a given time during a fueling operation, measuring a fuel pressure of the fuel within the fuel flow path at the given time, comparing the measured fuel pressure to a plurality of fuel pressure values from a data set including a plurality of actual fuel delivery rate values that correspond to the plurality of fuel pressure values, retrieving one of the plurality of actual fuel delivery rate values from the data set that corresponds to the measured fuel pressure value; and comparing the measured fuel delivery rate from the fuel meter to the one actual fuel delivery rate value to determine if the measured fuel delivery rate corresponds to the actual fuel delivery rate at which fuel is being dispensed to the vehicle.

Other objects, features and aspects for the present invention are discussed in greater detail below. The accompanying drawings are incorporated in and constitute a part of this specification, and illustrate one or more embodiments of the invention. These drawings, together with the description, serve to explain the principals of the invention.

BRIEF DESCRIPTION OF THE DRAWINGS

A full and enabling disclosure of the present invention, including the best mode thereof, to one of ordinary skill in the art, is set forth more particularly in the remainder of this specification, including reference to the accompanying drawings, in which;

FIGS. 7A through 7C are schematic diagrams of embodiments of fuel dispensers in accordance with the present invention;

Figure 1:
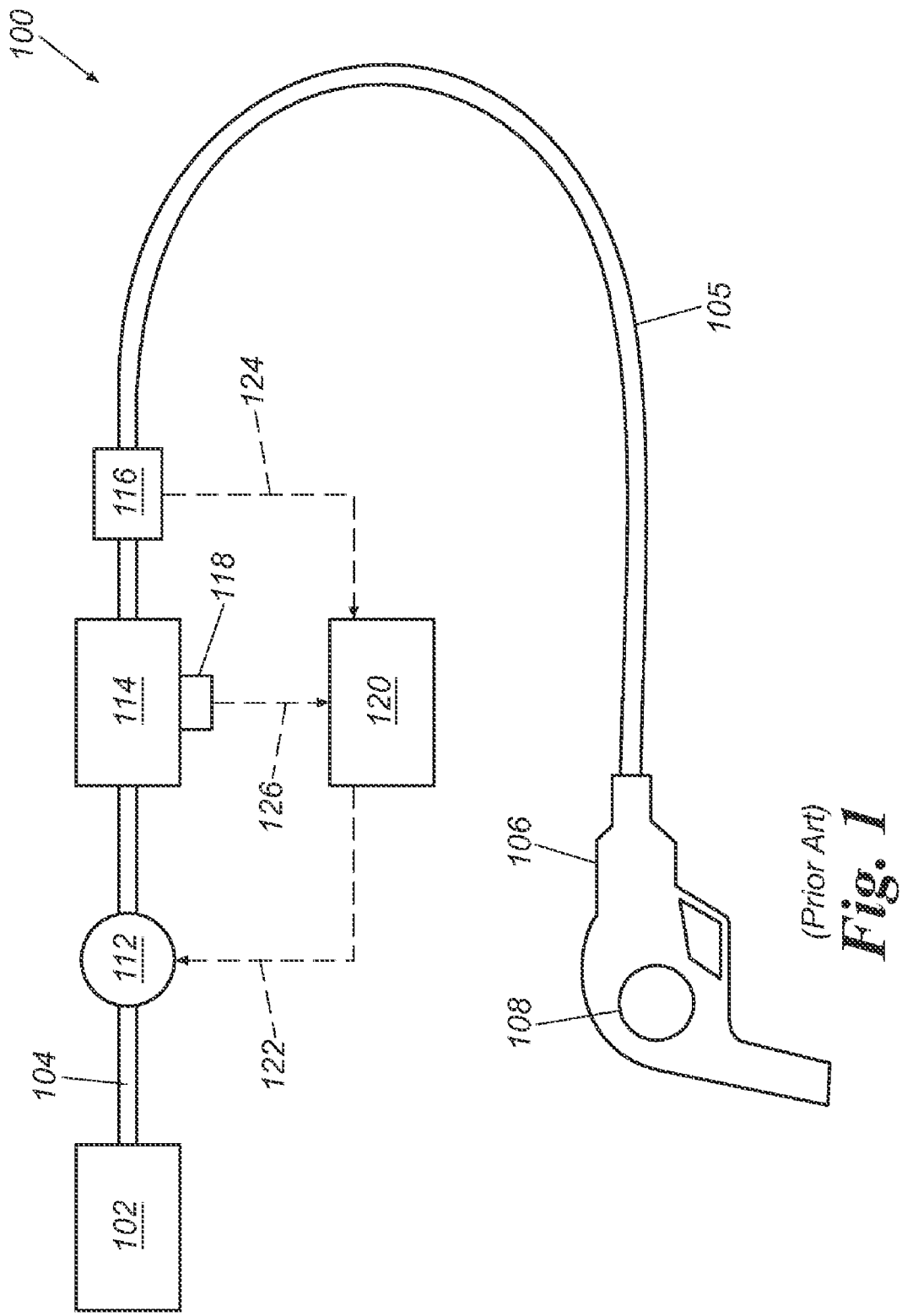
FIG. 1 is a schematic diagram showing components of a prior art fuel dispenser.

Repeat use of reference characters in the present specification and drawings is intended to represent same or analogous features or elements of the invention.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
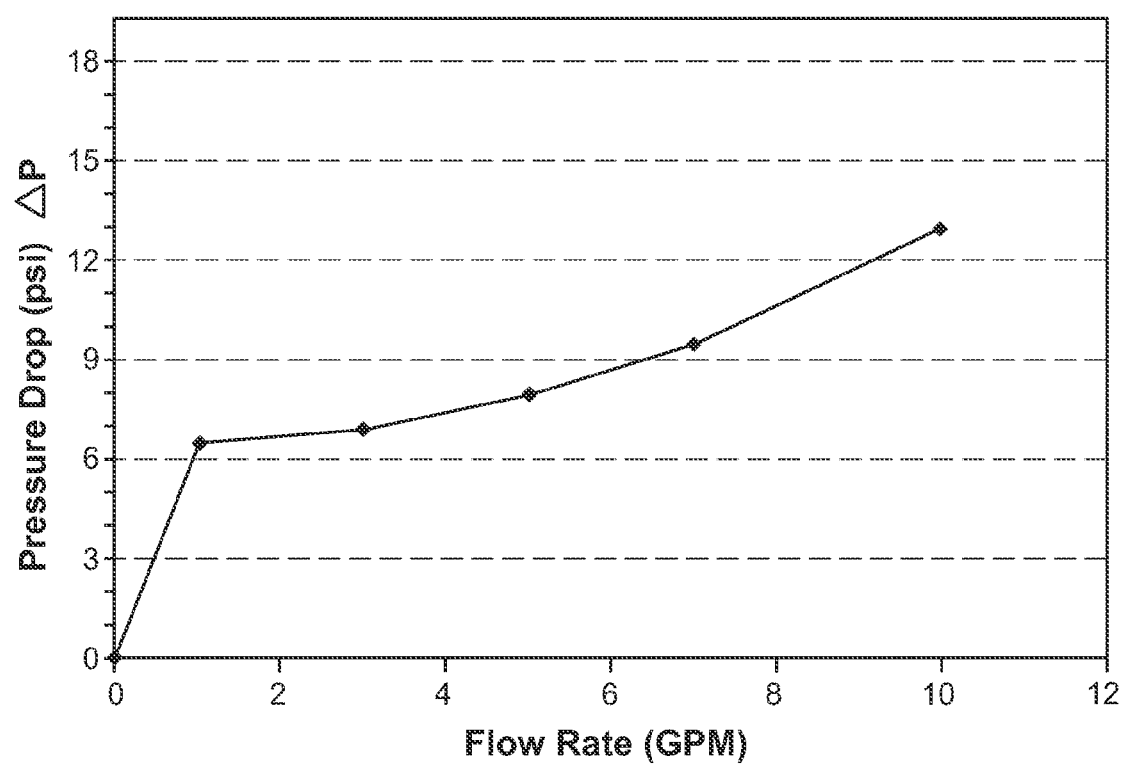
FIG. 2 is a graph depicting a relationship between the flow rates at which the fuel dispenser as shown in FIG. 1 dispenses fuel and the pressure differentials that develop within the fuel dispenser.

The various components of a prior art dispenser 100 are described above with reference to FIG. 1. A typical fuel supply pressure for fuel dispenser 100 is 30 pounds per square inch (psi) upstream of valve 112. As fuel is dispensed at increasing flow rates, the pressure differential between the fuel supply pressure and the fuel pressure at flow valve 108 increases. In the example, as shown in FIG. 2, a pressure differential of approximately 6 psi exists at a steady state flow rate of 2 gallons per minute (gpm), whereas at a flow rate of 10 gpm, the pressure differential is approximately 13 psi.

Figure 3:
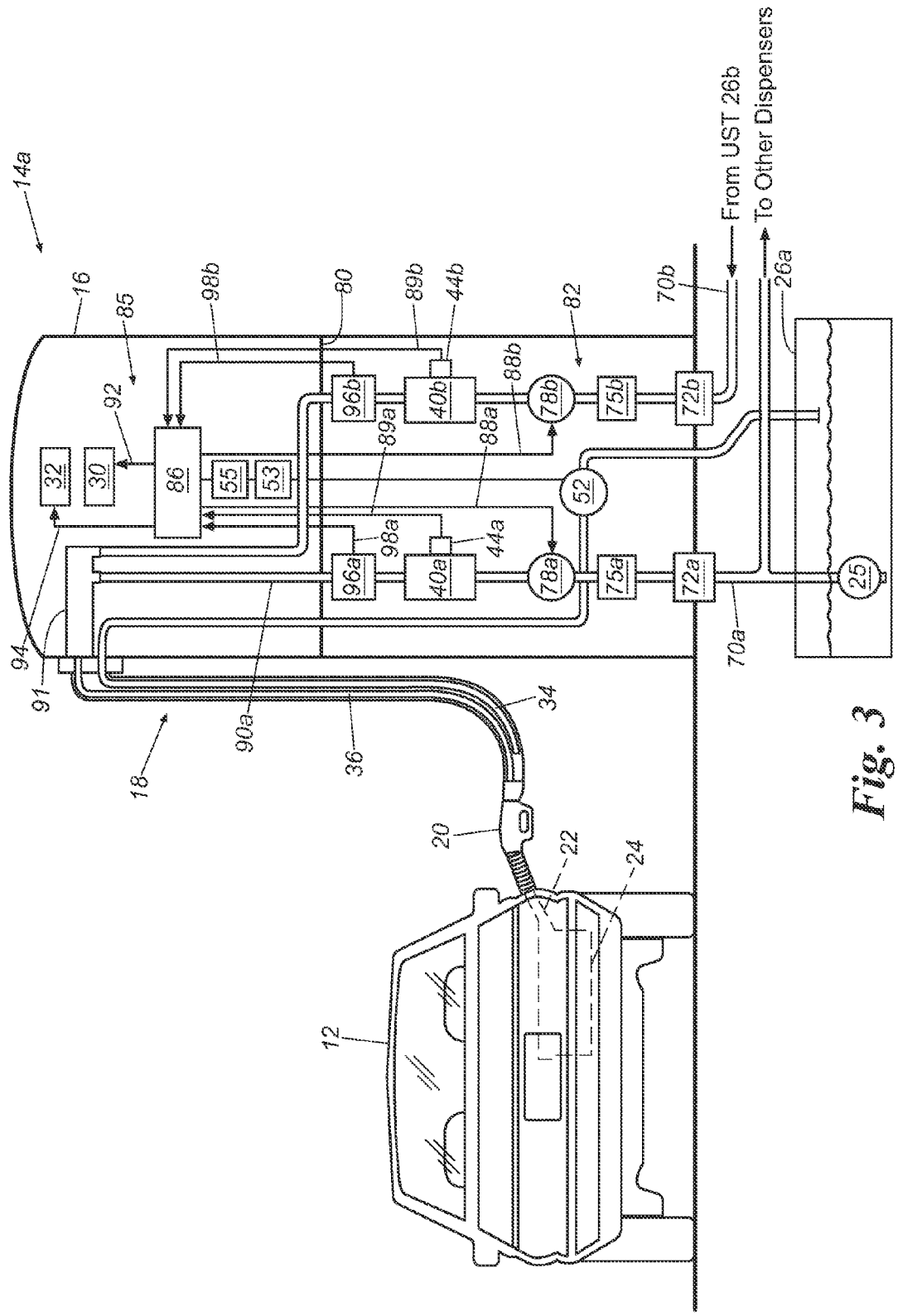
FIG. 3 illustrates a fuel dispenser in accordance with an embodiment of the present invention.
Figure 4:
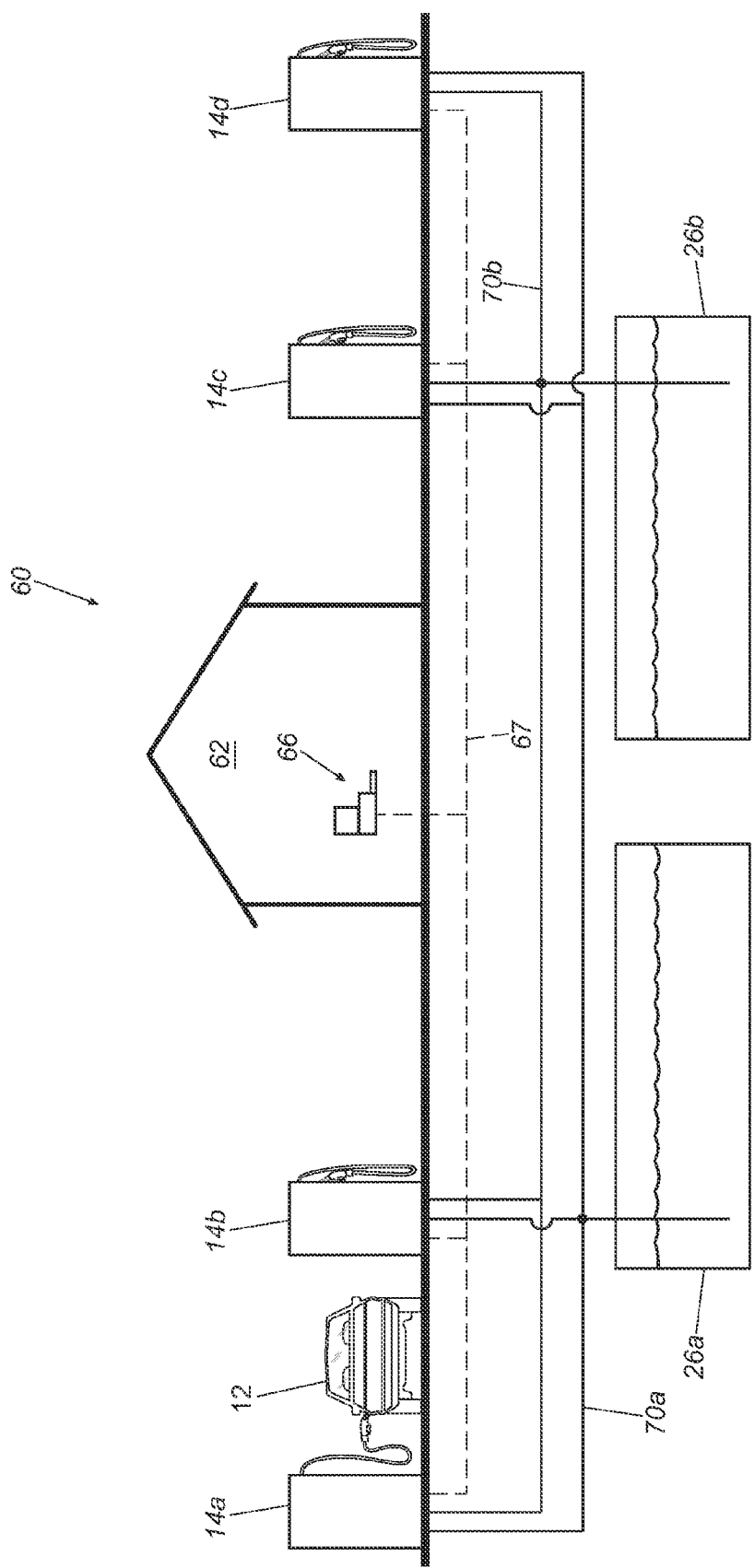
FIG. 4 illustrates a fueling environment including the fuel dispenser as shown in FIG. 3.

FIGS. 3 and 4 illustrate a fueling environment 60 including a central fuel station building 62 with a fuel station computer 66 in communication with a plurality of fuel dispensers 14a through 14d, with a vehicle 12 being fueled by fuel dispenser 14a. As shown in FIG. 3, fuel dispenser 14a includes a housing 16 with a flexible fuel hose 18 extending therefrom. Fuel hose 18 terminates in a manually operated nozzle 20 adapted to be inserted into a fill neck 22 of vehicle 12. Fuel flows from an underground storage tank 26a, 26b through fuel dispenser 14a, out through flexible fuel hose 18, down fill neck 22 to a fuel tank 24 of vehicle 12, as is well understood. Fuel dispenser 14a may be the ECLIPSE® or ENCORE® sold by the assignee of the present invention, or other fuel dispenser, such as that disclosed in U.S. Pat. No. 4,978,029, which is hereby incorporated by reference in its entirety.

The internal fuel flow components of one example of the present invention are illustrated in FIG. 3. As shown, fuel travels from one or more underground storage tanks 26a and 26b (FIG. 4) by way of fuel pipes 70a and 70b associated with their respective underground storage tank. Fuel pipes 70a and 70b may be double-walled pipes having secondary containment, as is well known. An exemplary underground fuel delivery system is illustrated in U.S. Pat. No. 6,435,204, which is hereby incorporated by reference in its entirety. As shown, a submersible turbine pump 25 associated with underground storage tank 26a is used to pump fuel to fuel dispenser 14a through fuel pipe 70a. Similarly, a submersible turbine pump (not shown) pumps fuel to fuel dispenser 14a through fuel pipe 70b. Alternately, some fuel dispensers may be self-contained, meaning fuel is drawn to the fuel dispenser by a pump controlled by a motor (not shown) positioned within the housing.

Fuel pipes 70a and 70b pass into housing 16 through shear valves 72a and 72b, respectively. Shear valves 72a and 72b are designed to cut off fuel flowing through their respective fuel pipes 70a and 70b if fuel dispenser 14a is impacted, as is commonly known in the industry. An exemplary embodiment of a shear valve is disclosed in U.S. Pat. No. 6,575,206, which is hereby incorporated by reference in its entirety. The dual fuel flow paths from underground storage tanks 26a and 26b to fuel nozzle 20 are substantially similar, and as such, for ease of description, only the flow path from underground storage tank 26a is discussed now. A fuel filter 75a and a proportional valve 78a are positioned along fuel line 70a upstream of fuel meter 40a. Alternatively, proportional valve 78a may be positioned downstream of fuel meter 40a. Fuel meter 40a and proportional valve 78a are positioned in a fuel handling compartment 82 of housing 16. Fuel handling compartment 82 is isolated from an electronics compartment 85 located above a vapor barrier 80. Fuel handling compartment 82 is isolated from sparks or other events that may cause combustion of fuel vapors, as is well understood and as is described in U.S. Pat. No. 5,717,564, which is hereby incorporated by reference in its entirety.

Fuel meter 40a communicates through vapor barrier 80 via a pulser signal line 89a to a control system 86 that is typically positioned within electronics compartment 85 of fuel dispenser 14a. Control system 86 may be a microcontroller, a microprocessor, or other electronics with associated memory and software programs running thereon. Control system 86 typically controls aspects of fuel dispenser 14, such as gallons (or liters) display 30, price display 32, receipt of payment transactions, and the like, based on fuel flow information received from fuel meter 40a.

Control system 86 regulates proportional valve 78a, via a valve communication line 88a, to open and close during fueling operations. Proportional valve 78a may be a proportional solenoid controlled valve, such as described in U.S. Pat. No. 5,954,080, which is incorporated herein by reference in its entirety. As control system 86 directs proportional valve 78a to open to allow increased fuel flow, the fuel enters proportional valve 78a and exists into fuel meter 40a. The flow rate of the displaced volume of the fuel is measured by fuel meter 40a which communicates the flow rate of the displaced volume of fuel to control system 86 via pulser signal line 89a. A pulse signal is generated on pulser signal line 89a in the example illustrated, such as by a Hall-effect sensor as described in U.S. Pat. No. 7,028,561, which is incorporated herein by reference in its entirety. In this manner, control system 86 uses the pulser signal from pulser signal line 89a to determine the flow rate of fuel flowing through fuel dispenser 14a and being delivered to vehicle 12. Control system 86 updates the total gallons dispensed on gallons display 30 via a gallons display communication line 92, as well as the price of fuel dispensed on price display 32 via a price display communication line 94.

Rather than incorporating a physical sensor as a pulser, additional embodiments of the present invention may have a fuel meter including application software of an associated microcontroller, microprocessor or electronics, that functions as the pulser. In these embodiments, a pulse signal is generated by the software that mimics the output of the physical sensor described above. As well, the software in these additional embodiments can be used to calculate the volume of fuel flowing through the fuel meter and provide this information to the control system.

As fuel leaves fuel meter 40a, the fuel enters a flow switch 96a. Flow switch 96a generates a flow switch communication signal via a flow switch signal line 98a to control system 86 to communicate when fuel is flowing through fuel meter 40a. The flow switch communication signal indicates to control system 86 that fuel is actually flowing in the fuel delivery path and that subsequent pulser signals from fuel meter 40a are due to actual fuel flow. For those embodiments where application software of a microcontroller or microprocessor associated with the fuel meter functions as the pulser, the flow switch sends the flow switch communication signal indicating that flow has been initiated to the fuel meter rather than the control system. The signal indicates to the fuel meter software that it should begin producing output signals to the control system that mimic those of the previously discussed mechanical pulsers.

After the fuel enters flow switch 96a, it exits through fuel conduit 90a to be delivered to a blend manifold 91. Blend manifold 91 receives fuels of varying octane values from the various underground storage tanks and ensures that fuel of the octane level selected by the consumer is delivered to the consumer's vehicle 12. After flowing through blend manifold 91, the fuel passes through fuel hose 18 and nozzle 20 for delivery into fuel tank 24 of vehicle 12. Flexible fuel hose 18 includes a product delivery line 36 and a vapor return line 34. Both lines 34 and 36 are fluidly connected to underground storage tank 26a through fuel dispenser 14a. Once in fuel dispenser 14a, lines 34 and 36 separate.

During delivery of fuel into the vehicle fuel tank, the incoming fuel displaces air in the fuel tank containing fuel vapors. Vapor is recovered from fuel tank 24 of vehicle 12 through vapor return line 34 with the assistance of a vapor pump 52. A motor 53 operates vapor pump 52. As discussed above, control system 86 receives information from fuel meter 40a and pulser 44a regarding the amount of fuel being dispensed. Fuel meter 40a measures the fuel being dispensed while pulser 44a generates a pulse per count of fuel meter 40a. In an exemplary embodiment, pulser 44a generates one thousand and twenty-four (1024) pulses per gallon of fuel dispensed. Control system 86 controls a drive pulse source 55 that in turn controls motor 53. As previously noted, control system 86 may be a microprocessor, microcontroller, etc. with an associated memory that operates to control the various functions of the fuel dispenser including, but not limited to: fuel transaction authorization, fuel grade selection, display and/or audio control. Vapor pump 52 may be a variable speed pump or a constant speed pump with or without a controlled valve (not shown), as is well known in the art.

In addition to measuring the volume of fuel dispensed, fuel meters 40a and 40b of the illustrated embodiment also provide the function of determining if an actual fuel delivery rate at which fuel is being delivered to a vehicle during a fueling process is equivalent to a measured fuel delivery rate as determined by the fuel meter. In so doing, the fuel meters are able to terminate the flow of fuel and/or indicate an error condition should the actual fuel delivery rate differ by more than a given amount from the measured fuel delivery rate.

As previously discussed, it is not uncommon for thieves to attempt to steal fuel from a fuel dispenser by initiating the flow of fuel and then disabling various components, such as the pulser, so that the flow of fuel goes undetected by the fuel dispenser. In order to determine whether the actual fuel delivery rate corresponds to the measured fuel delivery rate, fuel meters 40a and 40b measure various flow parameters within their respective fuel flow paths at a given time during a fueling operation and retrieve a fuel delivery rate value from a data set that corresponds to the measured flow parameters. For the preferred embodiments discussed herein, the measured flow parameter is preferably fuel pressure. The fuel delivery rate values are retrieved from experimental data that is compiled through testing and then embedded in software of fuel meters 40a and 40b. The fuel delivery rate values are then compared to the measured fuel delivery rate as determined by fuel meters 40a and 40b. The fuel meters preferably perform this function over the course of the fueling process at selected intervals.

Figure 5:
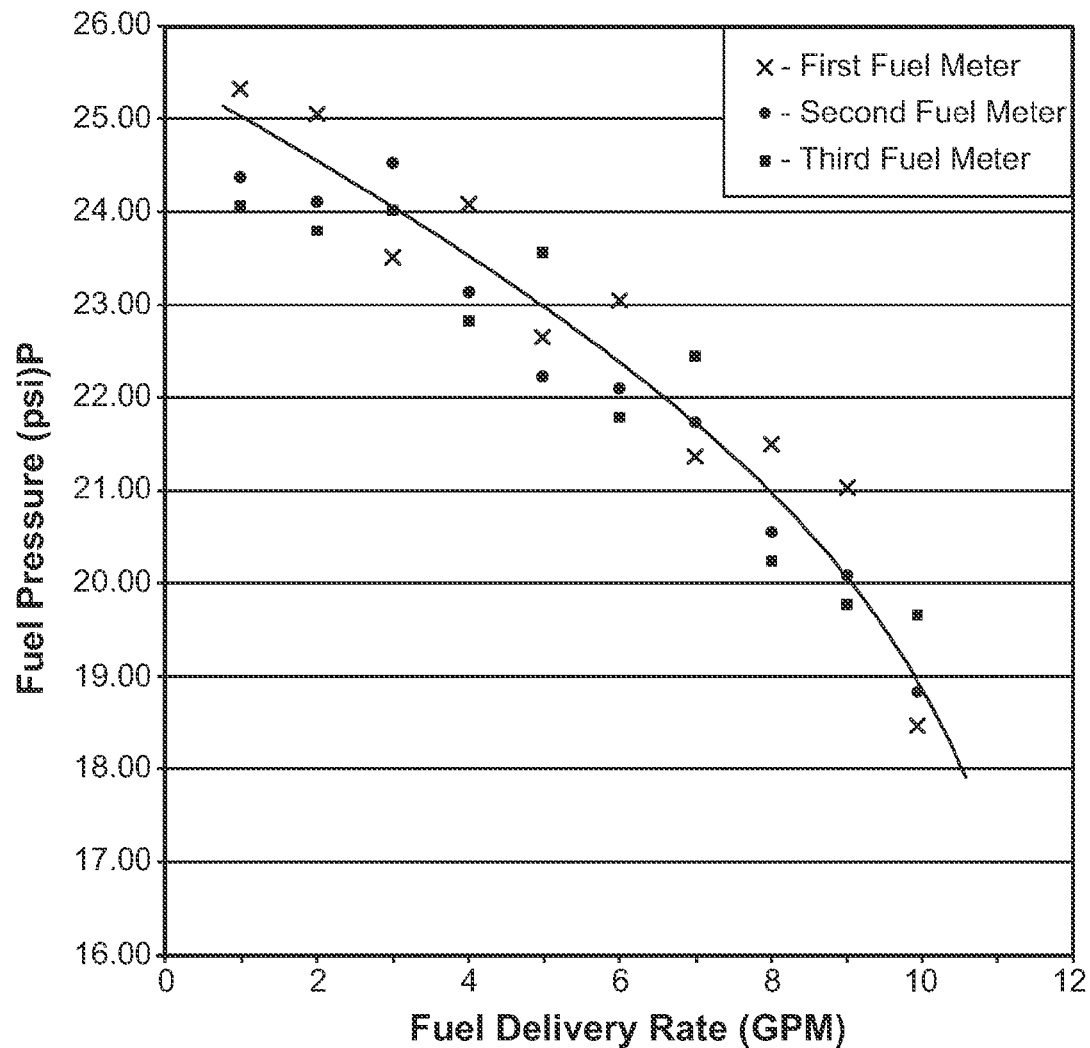
FIG. 5 is a graph depicting the relationship between the flow rates at which the fuel dispenser as shown in FIG. 3 dispenses fuel and the pressure differentials that develop within the fuel dispenser.
Figure 6:
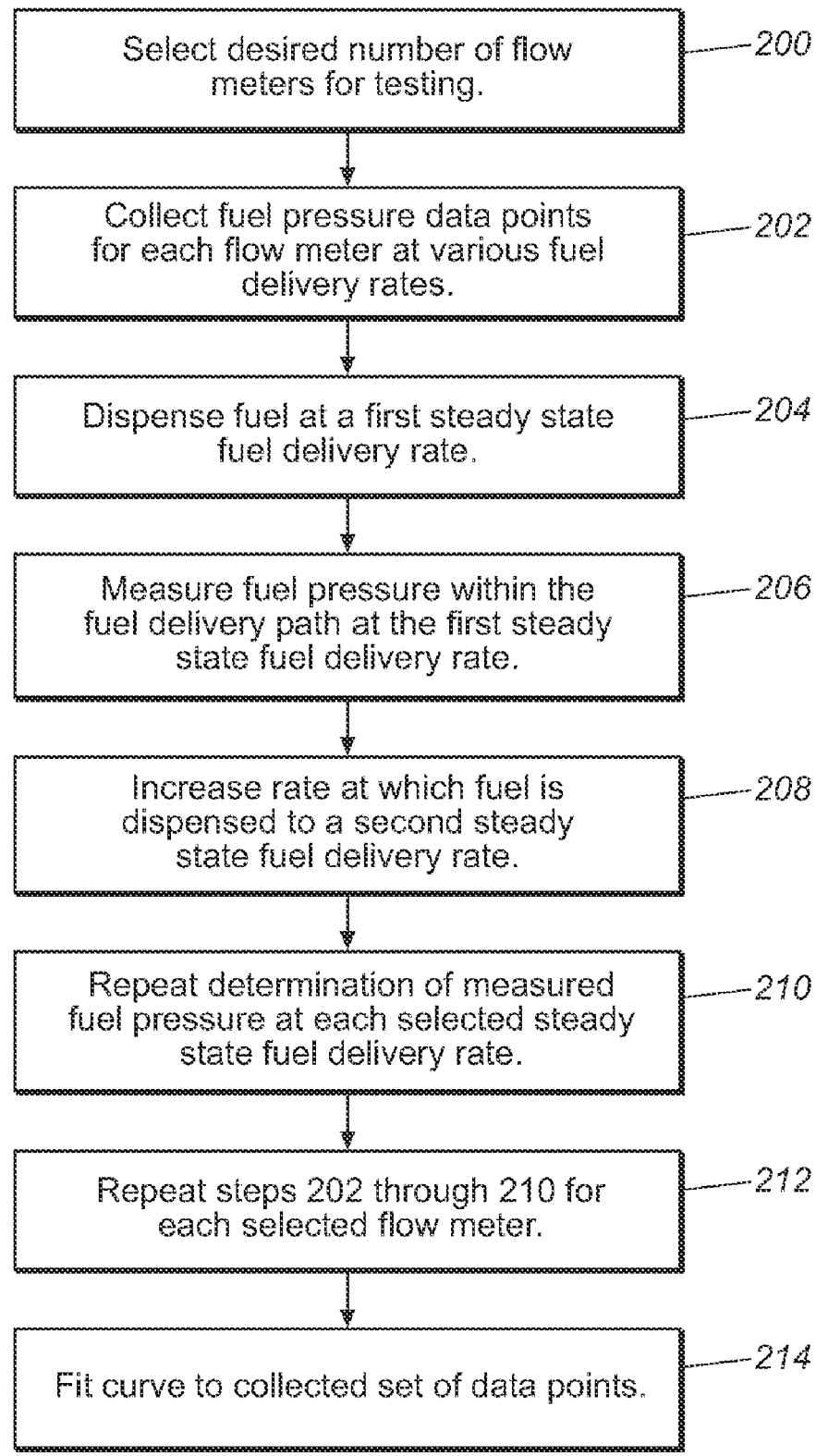
FIG. 6 is a flow chart depicting a method of creating the graph as shown in FIG. 5.

FIG. 5 provides a graphical representation of fuel delivery rate value data as would be embedded in the software of the fuel meters of an exemplary embodiment of the present invention. Referring also to the flow chart shown in FIG. 6, one method of creating the fuel delivery rate value data, as shown in FIG. 5, is now discussed. The fuel delivery rate value data table is created by first selecting a desired number of fuel meters of the same type and model, for testing, as shown at step 200, each fuel meter falling within acceptable calibration standards for that model. Next, as shown at step 202, each fuel meter is installed in a test fuel dispensing system and data points (P) are collected at various fuel delivery rates for that meter. For example, as seen in FIG. 5, data points (represented by "x") are collected for a first fuel meter at intervals of one gallon per minute fuel delivery rate from between one gallon per minute to 10 gallons per minute.

Figure 7A:
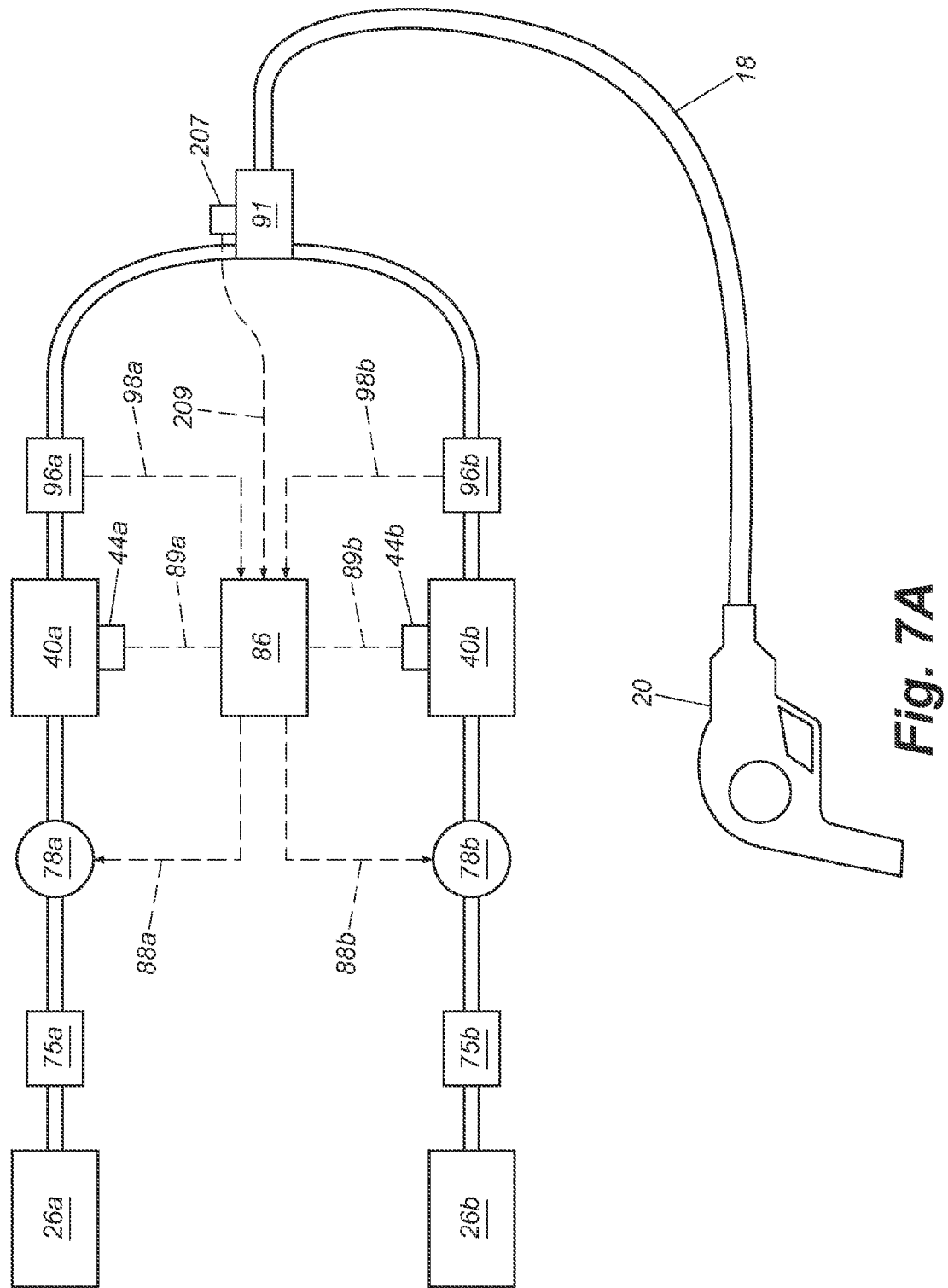

As shown in step 204, for a first data point of the first fuel meter, fuel is dispensed at a first steady state fuel delivery rate. Next, as shown at step 206, the fuel pressure within the fuel delivery path is measured at the first steady state fuel delivery rate, as measured by the fuel meter. As previously discussed, fuel pressure varies along the fuel delivery path as fuel is dispensed. As such, the location, or multiple locations, at which the fuel pressure is measured during the fueling process will affect the magnitudes of the measured fuel pressure values and, therefore, affect the shape of the data curve, as shown in the graphical representations. For the current preferred embodiment (as shown in FIG. 7A), a pressure sensor 207 is used to measure fuel pressures at blend manifold 91 within the fuel delivery path during fueling operations. Pressure sensor 207 communicates with control system 86 via a signal line 209. Alternative preferred embodiments include pressure sensors located at different positions throughout the fuel delivery path, as discussed in greater detail below.

Next, as shown at step 208, the fuel delivery rate is increased until fuel is dispensed at a second steady state fuel delivery rate. Upon reaching the second steady state fuel delivery rate, fuel pressure is once again measured, as shown at step 210. As shown in FIG. 5, this process is repeated at the selected interval of fuel delivery rates, over the operating range of the selected fuel meter.

Figure 8A:
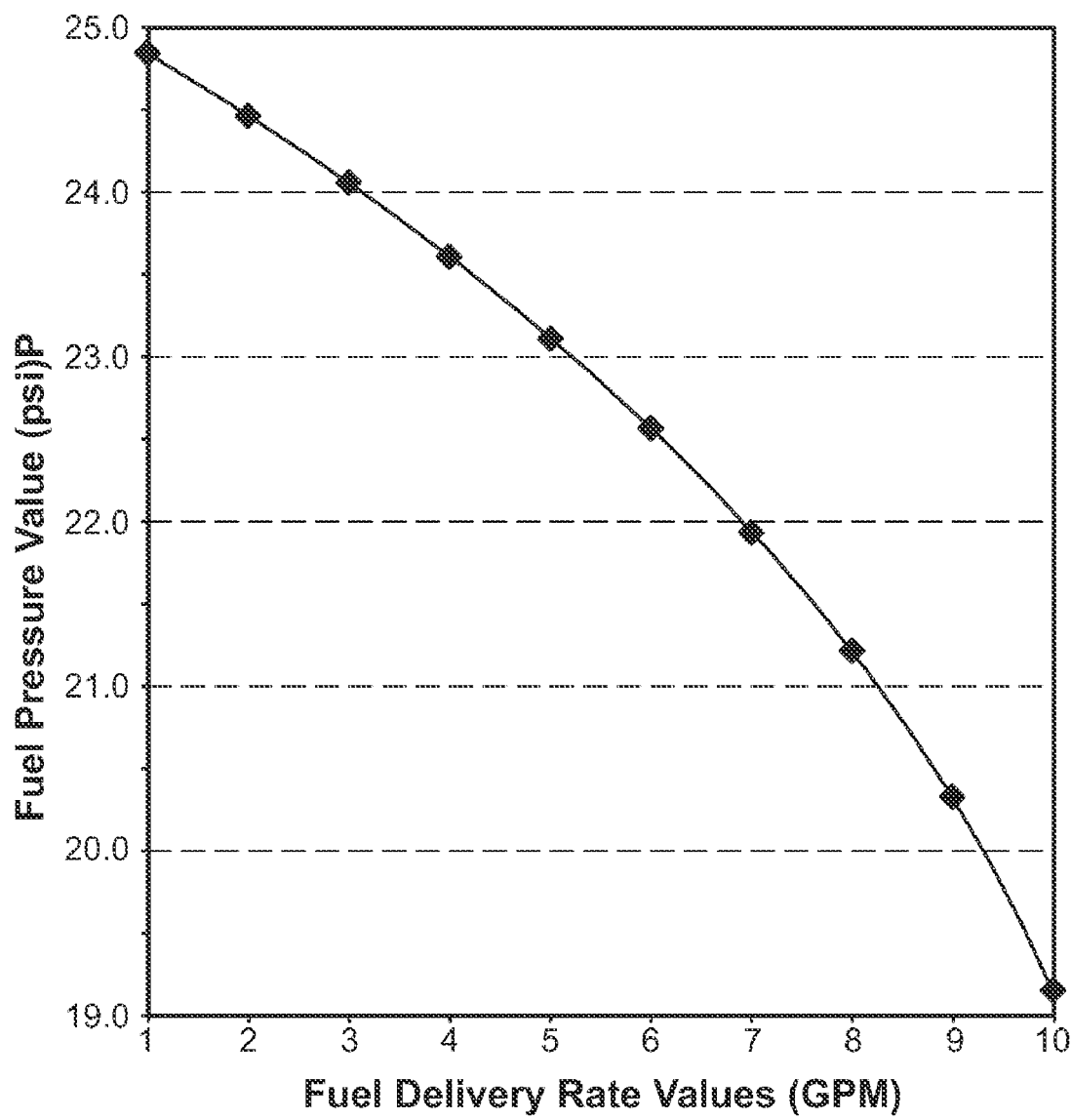
FIGS. 8A through 8C are graphs depicting pressure measurements for various flow rates within the embodiments of fuel dispensers as shown in FIGS. 7A through 7C, respectively.

The process of collecting data points discussed above is repeated for each of the selected fuel meters (in the instant case, second fuel meter and third fuel meter), as shown at step 212. As would be expected, minor variations from meter to meter can occur for the selected fuel delivery rates, resulting in a spread of data points, as shown in FIG. 5. As such, as shown at step 214, a curve is fit to the spread of data points so that fuel pressure values (P) and fuel delivery rate values (GPM) are available across the continuous range of fuel delivery rates in which the fuel meters and their associated dispensers operate. As best seen in FIG. 8A, the resulting data set comprises the plurality of data points for fuel pressure values (P) and their corresponding fuel delivery rate values (GPM) that lie along the curve.

Figure 7B:
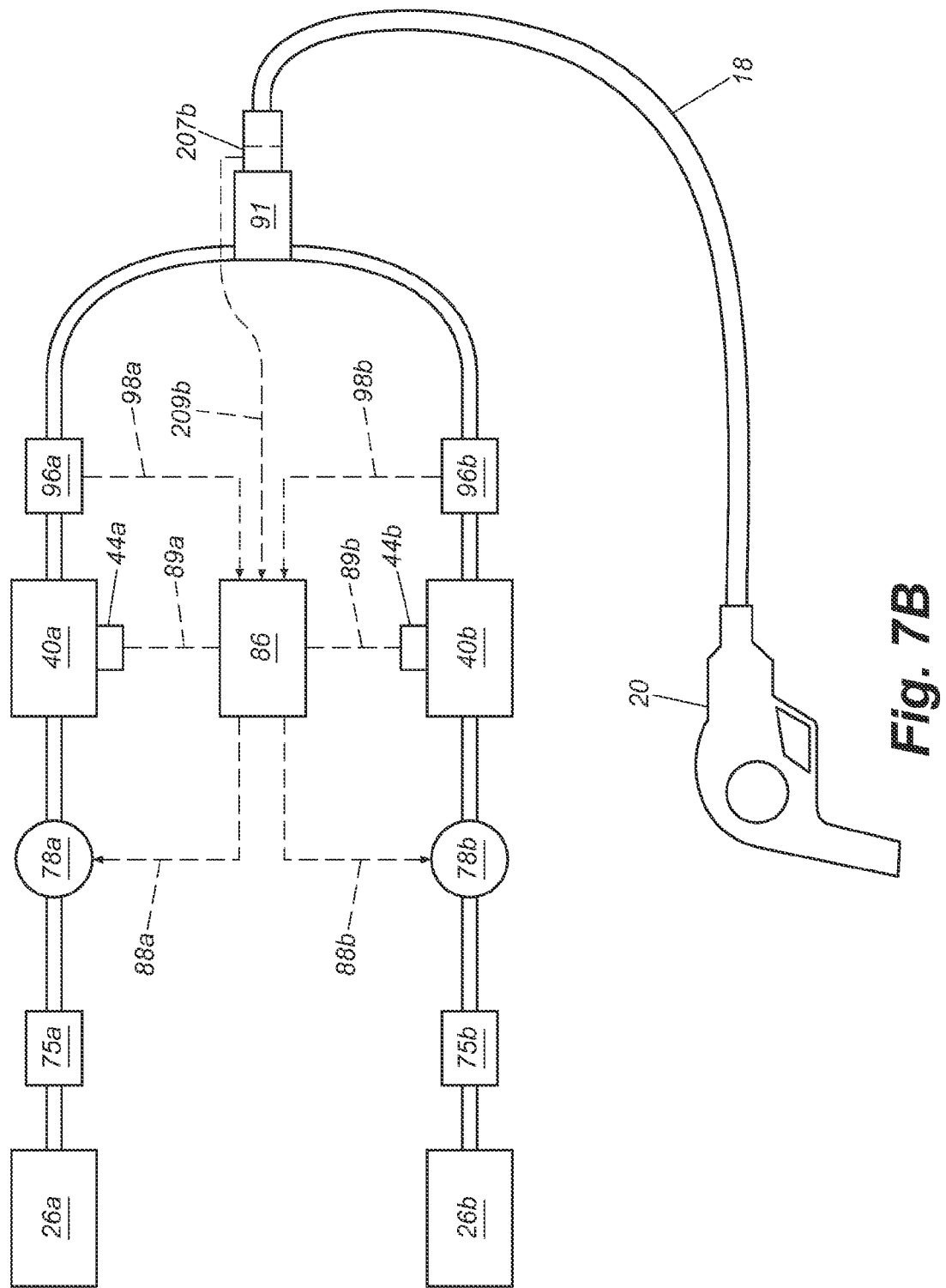
Figure 8B:
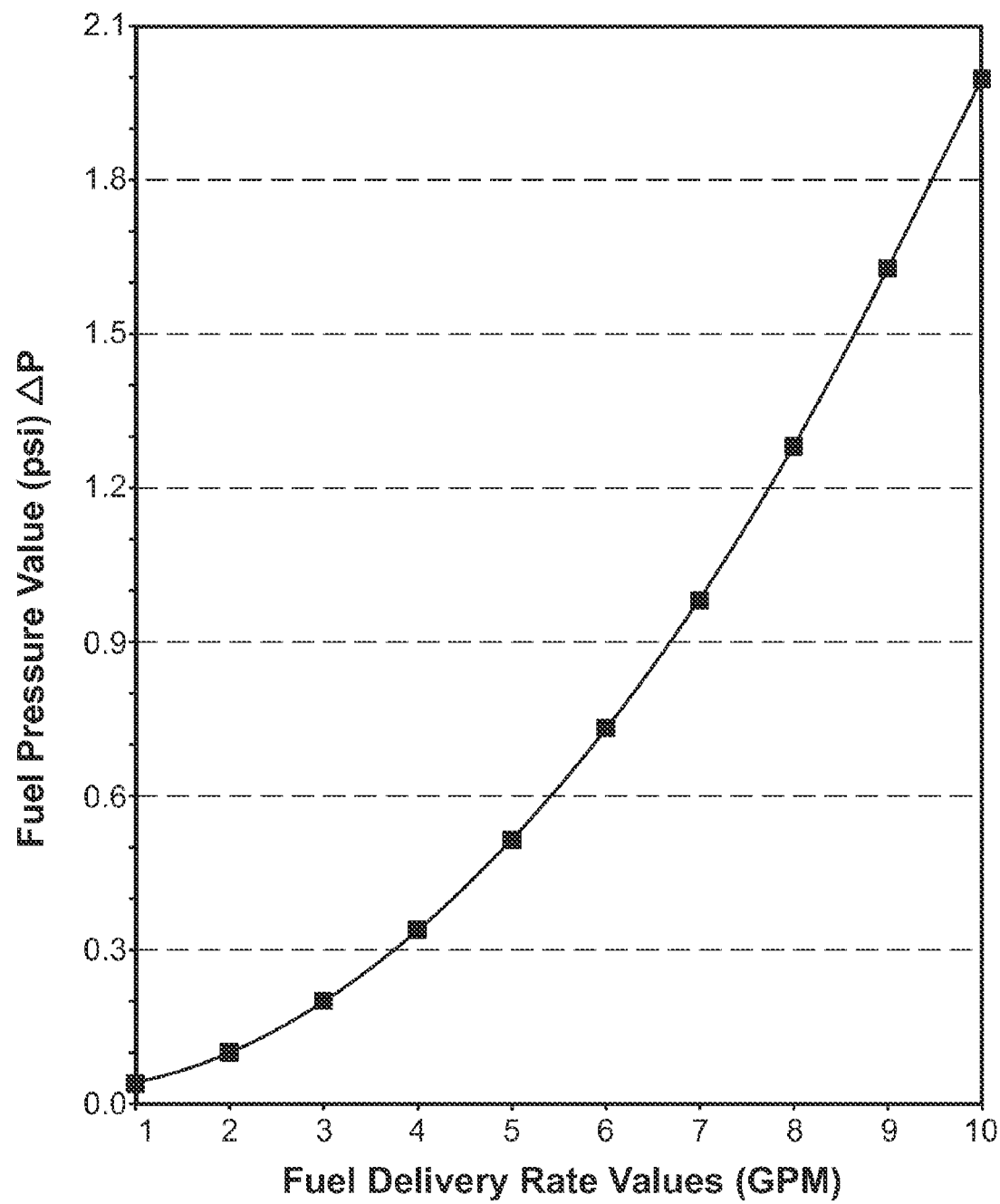

As previously noted, the data set graph shown in FIG. 8A corresponds to the schematic diagram of a preferred embodiment of the present invention as shown in FIG. 7A. However, alternate embodiments in accordance with the present invention are possible. For example, referring now to FIGS. 7B and 8B, an alternate embodiment in accordance with the present invention can include a fuel dispenser with a differential pressure sensor 207b disposed at blend manifold 91. As such, as best seen in FIG. 8B, the fuel pressure values of the collected data set are a plurality of differential pressure values rather than fuel system pressures within the blend manifold 91, as discussed in the previous embodiment.

Figure 8C:
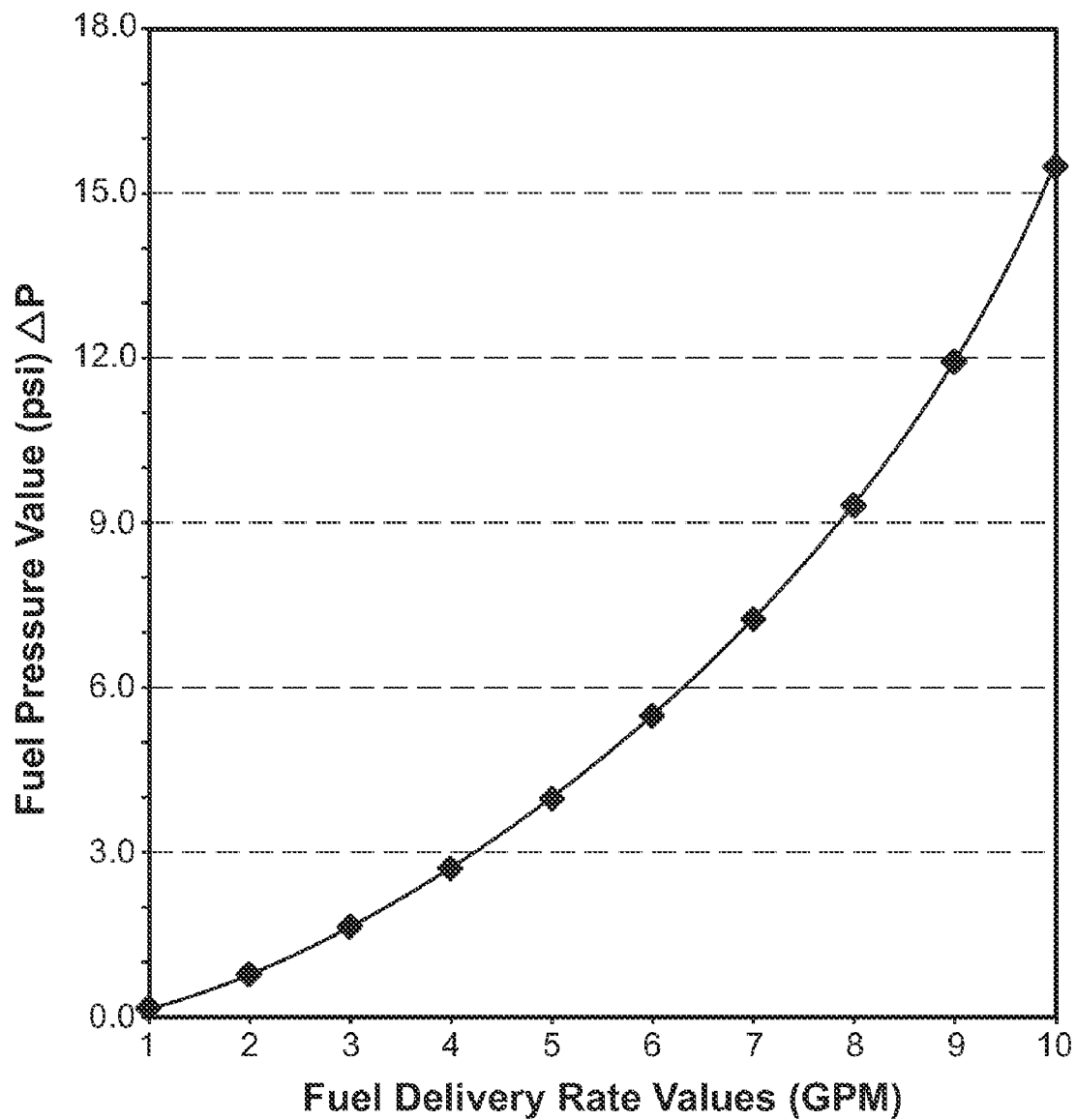

As shown in FIGS. 7C and 8C, another alternate embodiment of a dispenser in accordance with the invention is shown wherein the data set includes a plurality of differential pressures as the fuel pressure values. More specifically, as best seen in FIG. 7C, pressure sensors 207c, 207d, and 207e are positioned at blend manifold 91, proportional valve 78a and proportional valve 78b, respectively. In this manner, differential pressures can be determined between the upstream side of each proportional valve 78a and 78b and blend manifold 91, when compiling the desired data set. By selecting various placements for pressure sensors, such as those shown in FIG. 7C, the generated differential pressures can be used to help determine the performance of various system components, in addition to determining whether the actual fuel delivery rate of the fuel dispenser corresponds to the measured fuel delivery rate as determined by the fuel meter. However, each of the disclosed embodiments as shown in FIGS. 7A through 7C function in substantially the same manner with regard to utilizing fuel pressure measurements to monitor fuel delivery rates. As such, only the embodiment as shown in FIG. 7A is discussed below.

Figure 9:
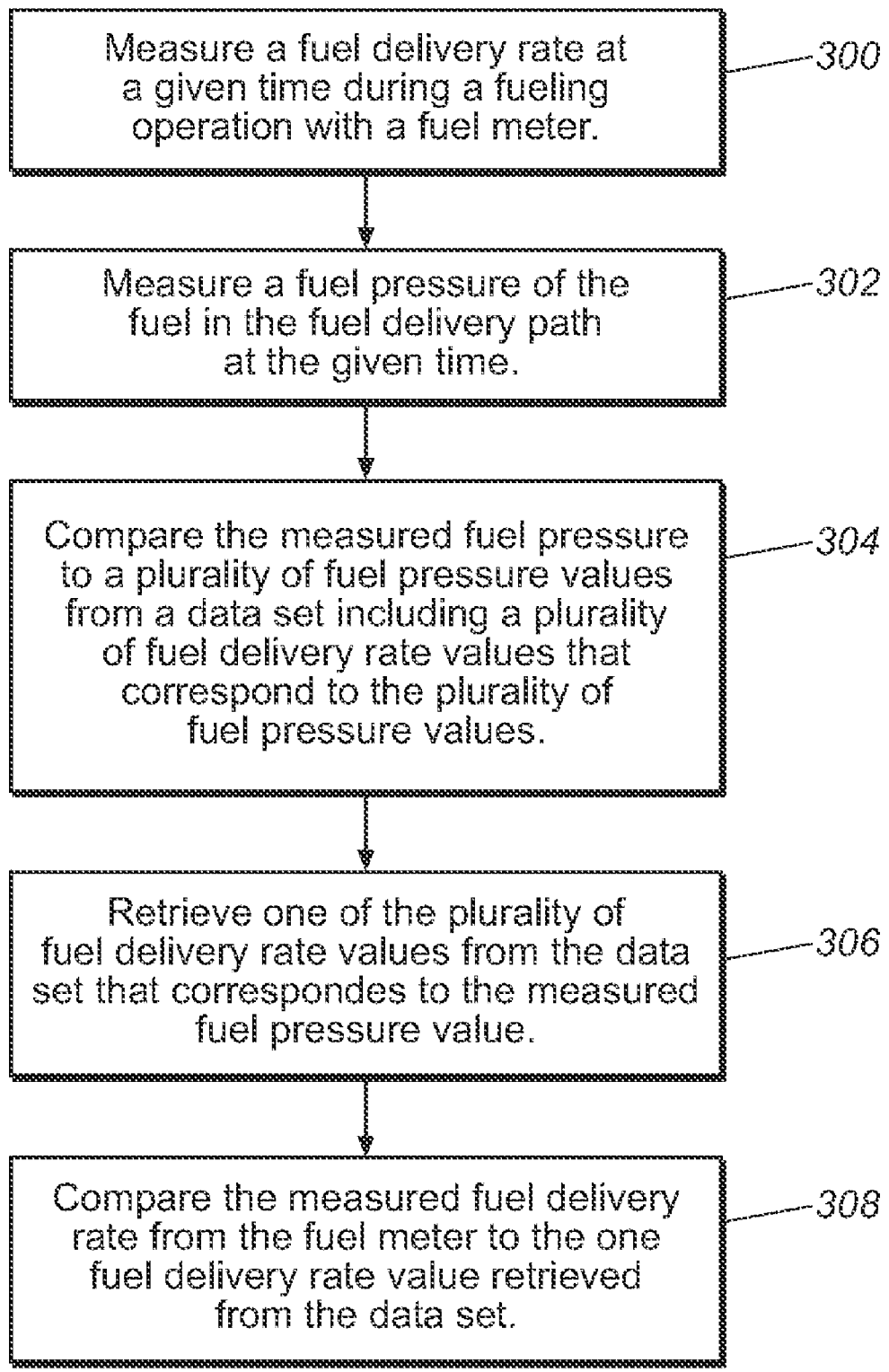
FIG. 9 is a flow chart depicting a method determining if the actual amount of fuel being dispensed by the fuel dispenser as shown in FIG. 3 corresponds to the amount as measured by the fuel dispenser.

Referring now to the flow chart shown in FIG. 9, the method by which the fuel meters of the disclosed fuel dispenser determine whether a measured fuel delivery rate determined by the fuel meters corresponds to an actual fuel delivery rate at which fuel is being dispensed to a vehicle is discussed. As previously noted, a fuel dispenser may undergo discrepancies between the measured fuel delivery rate and the actual fuel delivery rate at which fuel is being dispensed because of mechanical failures, as well as persons tampering with the fuel dispenser. To account for these potential inaccuracies, the fuel dispenser detects when a fueling operation begins and measures a fuel delivery rate with a fuel meter at a given time during the fueling operation, as shown at step 300. As shown at step 302, the fuel pressure of the fuel in the fuel delivery path is also measured at the same given time. As shown in FIG. 7A, pressure sensor 207 measures the fuel pressure within blend manifold 91 at the given time, and reports the measured fuel pressure to control system 86.

As shown at step 304, the microprocessor, microcontroller or electronics associated with the fuel meter enters a data set, such as that discussed above and graphically shown in FIGS. 5 and 8A, and compares the measured fuel pressure from the pressure sensor to a plurality of fuel pressure values from the data set. Next, the fuel delivery rate value that corresponds to the selected fuel pressure value that is equal to the measured fuel pressure is retrieved, as shown at step 306. For example, from the data set shown in FIG. 8A, for a fuel pressure value of 22.0 psi, the control system would retrieve an actual fuel delivery rate value of 7 gpm. Preferably, the data set is embedded in software, firmware, etc., within the fuel meters. As shown at step 308, the retrieved fuel delivery rate value from the data set is compared to the measured fuel delivery rate from the fuel meter to determine if any discrepancies exist. If discrepancies do exist, but are acceptable, the fueling operation can be allowed to continue. If, however, the discrepancies do not fall within an acceptable value, the control system can terminate the flow of fuel into the vehicle and/or sound an alarm condition.

Referring back to FIG. 4, rather than being embedded in the software of each individual fuel meter, it is also possible that the discussed fuel delivery rate value data sets be embedded in software that is in the control system or that is remote from the fuel dispensers, such as the software that is contained within fuel station computer 66. As shown, fuel station computer 66 is in communication with individual fuel dispensers 14a, 14b, 14c and 14d via communication line 67.

While preferred embodiments of the invention have been shown and described, modifications and variations thereto may be practiced by those of ordinary skill in the art without departing from the spirit and scope of the present invention, which is more particularly set forth in the appended claims. In addition, it should be understood the aspects of the various embodiments may be interchanged without departing from the scope of the present invention. Furthermore, those of ordinary skill in the art will appreciate that the foregoing description is by way of example only, and is not intended to limit the invention as further described in such appended claims.

What is claimed is:

1. A fuel dispenser configured to determine an actual fuel delivery rate at which fuel is being delivered to a vehicle during a fueling process, the fuel dispenser comprising:
   a fuel delivery path configured to deliver fuel to the vehicle;
   a fuel meter configured to measure a fuel delivery rate at which fuel is being dispensed through the fuel delivery path to the vehicle;
   a data set having a plurality of fuel pressure values corresponding to a plurality of actual fuel delivery rate values;
   a pressure sensor configured to measure a fuel pressure of the fuel in the fuel delivery path; and
   a controller configured to determine the actual fuel delivery rate at which fuel is being delivered to the vehicle based on the measured fuel pressure from the pressure sensor, wherein the fuel meter determines the measured fuel delivery rate at a given time, the pressure sensor determines the measured fuel pressure at the given time, the controller compares the measured fuel pressure to the plurality of fuel pressure values in the data set and determines which actual fuel delivery rate value from the data set corresponds to the measured fuel pressure and compares the measured fuel delivery rate from the fuel meter to the actual fuel delivery rate value from the data set to determine if the fuel meter is accurately measuring the actual fuel delivery rate at which fuel is being delivered to the vehicle.

2. The fuel dispenser of claim 1, wherein a flow of fuel to the vehicle is terminated if the controller determines the actual flow delivery rate value from the data set is greater than the measured fuel delivery rate from the fuel meter by a given value.

3. The fuel dispenser of claim 1, further comprising a blend manifold in the fuel delivery path.

4. The fuel dispenser of claim 1, wherein the pressure sensor further comprises a differential pressure sensor such that the measured fuel pressure is a differential fuel pressure.

5. The fuel dispenser of claim 1, wherein the controller is a component of the fuel meter.

6. The fuel dispenser of claim 1, further comprising a control system that is remote from the fuel meter and the controller is a component of the control system.

7. The fuel dispenser of claim 1, wherein the data set is embedded in software of the controller.

8. The fuel dispenser of claim 1, wherein the controller further comprises a microprocessor.

9. A method of determining whether a measured fuel delivery rate determined by a fuel meter of a fuel dispenser corresponds to an actual fuel delivery rate at which fuel is being dispensed to a vehicle through a fuel flow path, comprising:
    measuring a fuel delivery rate at a given time during a fueling operation;
    measuring a fuel pressure of the fuel within the fuel flow path at the given time;
    comparing the measured fuel pressure to a plurality of fuel pressure values from a data set including a plurality of actual fuel delivery rate values that correspond to the plurality of fuel pressure values;
    retrieving one of the plurality of actual fuel delivery rate values from the data set that corresponds to the measured fuel pressure value; and
    comparing the measured fuel delivery rate from the fuel meter to the one actual fuel delivery rate value to determine if the measured fuel delivery rate corresponds to the actual fuel delivery rate at which fuel is being dispensed to the vehicle.

10. The method of claim 9, wherein measuring the fuel pressure further comprises measuring a differential fuel pressure.

11. The method of claim 9, further comprising terminating a flow of fuel to the vehicle if the actual fuel delivery rate value from the data set is greater than the measured fuel delivery rate from the fuel meter by a given value.

12. A fuel dispenser configured to determine an actual fuel delivery rate at which fuel is being delivered to a vehicle during a fueling process, the fuel dispenser comprising:
    a fuel delivery path configured to deliver fuel to the vehicle;
    a fuel meter configured to determine a measured fuel delivery rate at which fuel is being dispensed through the fuel delivery path to the vehicle;
    a data set having a plurality of fuel parameter values corresponding to a plurality of actual fuel delivery rate values;
    a sensor configured to determine a measured fuel parameter of the fuel in the fuel delivery path; and
    a controller configured to determine the actual fuel delivery rate at which fuel is being delivered to the vehicle based on the measured fuel parameter from the sensor,
    wherein the fuel meter determines the measured fuel delivery rate at a given time, the sensor determines the measured fuel parameter at the given time, the controller compares the measured fuel parameter to the plurality of fuel parameter values in the data set and determines which actual fuel delivery rate value from the data set corresponds to the measured fuel parameter and compares the measured fuel delivery rate from the fuel meter to the actual fuel delivery rate value from the data set to determine if the fuel meter is accurately measuring the actual fuel delivery rate at which fuel is being delivered to the vehicle.

13. The fuel dispenser of claim 12, wherein a flow of fuel to the vehicle is terminated if the controller determines the actual flow delivery rate value from the data set is greater than the measured fuel delivery rate from the fuel meter by a given value.

14. The fuel dispenser of claim 12, wherein the sensor further comprises a differential pressure sensor such that the measured fuel parameter is a differential fuel pressure.

15. The fuel dispenser of claim 12, wherein the controller is a component of the fuel meter.

16. The fuel dispenser of claim 12, wherein the sensor further comprises a pressure sensor configured to measure a fuel pressure of the fuel in the fuel delivery path.

17. The fuel dispenser of claim 12, further comprising a control system that is remote from the fuel meter and the controller is a component of the control system.

* * * * *